United States Patent [19]
Dicken, Jr.

[11] 3,768,771
[45] Oct. 30, 1973

[54] FLUID CONTROL VALVE WITH IMPROVED DIAPHRAGM

[75] Inventor: John A. Dicken, Jr., Louisville, Ky.

[73] Assignee: General Electric Company, Louisville, Ky.

[22] Filed: Nov. 12, 1971

[21] Appl. No.: 198,174

[52] U.S. Cl.................. 251/38, 251/30, 251/45, 137/242
[51] Int. Cl.............. F16k 31/385, F16k 31/40
[58] Field of Search ............ 251/38, 30, 45, 46; 137/242, 525, 525.1; 138/43, 46

[56] References Cited
UNITED STATES PATENTS
| | | | |
|---|---|---|---|
| 3,308,798 | 3/1967 | Snider | 137/525.1 X |
| 3,103,338 | 9/1963 | Marmo | 251/30 X |

Primary Examiner—Arnold Rosenthal
Attorney—George C. Atwell et al.

[57] ABSTRACT

A fluid control valve, of the type utilizing pressure differential across a diaphragm as the controlling parameter, is provided with a flexible diaphragm which is mounted so as to be substantially limited to flexing in a single direction. Consequent distension of the diaphragm is likewise substantially limited to a single direction. A bleed hole in the diaphragm is provided for passing pressurized fluid between the surfaces of the diaphragm for the creation of a pressure differential thereacross. The bleed hole is elongated and preferably oblong in perimeter and is oriented with its minor axis in substantial alignment with the direction of distension so that as the diaphragm material is stretched, the shape of the bleed hole becomes more nearly circular.

5 Claims, 5 Drawing Figures

Patented Oct. 30, 1973 3,768,771

INVENTOR.
JOHN A. DICKEN JR.
BY George C. Atwell
HIS ATTORNEY

FLUID CONTROL VALVE WITH IMPROVED DIAPHRAGM

BACKGROUND OF THE INVENTION

This invention relates to valves for controlling fluid flow through a passage. More particularly, this invention relates to valves of the commonly known pilot-operated type wherein a diaphragm performs the fluid controlling function. Devices of this type are commonly used to control the influx of pressurized water into washing machines and other apparatus wherein the volume of fluid flow is to be controlled.

Prior art valves of this type commonly include as basic elements a valve seat disposed within a passage through which the controlled fluid is to pass, a flexible diaphragm disposed adjacent to the valve seat and substantially isolating the passage from an associated chamber, first and second apertures in the diaphragm for providing communication between the passage and the chamber, and means for selectively opening and closing the first aperture to allow or deny the communication through this first aperture. The last-mentioned means is commonly a solenoid whose armature carries a protrusion suitable for insertion into a blockage of the first aperture. The second aperture serves as a bleed hole to allow a portion of the flow of fluid from the passage to enter the chamber. The selective closing and opening of the first aperture, which is of larger dimension than the second aperture, causes the accumulation or evacuation of pressurized controlled fluid within the chamber. The pressure differential created across the diaphragm as a consequence of the accumulation or evacuation of controlled fluid in the chamber serves to seat or unseat the diaphragm relative to the adjacent valve seat, consequently closing and opening the passage for the flow of controlled fluid therethrough.

In its unseated condition, the diaphragm is stretched or distended in response to the pressurized fluid. A common problem with prior art diaphragms is that after repeated stretching, the bleed hole, which is commonly generally circular in perimetrical configuration, eventually becomes deformed and closes. When this occurs, a seating pressure differential cannot be created by the closing of the first aperture. As a result, the diaphragm will not become re-seated in response to de-energization of the armature, and control of the fluid within the passage is lost. A flooding condition often results. It is toward a solution to this common problem that the present invention is directed.

It is therefore an objective of this invention to provide a flow controlling valve which does not cause undesirable flooding.

It is a further objective of this invention to provide an improved diaphragm for flow controlling valves.

It is a further objective of this invention to provide a flexible diaphragm having a bleed hole therein not subject to becoming blocked by distension of the diaphragm.

Further objectives of this invention will become apparent from the description of the preferred embodiment and its operation which follows.

SUMMARY OF THE INVENTION

In order to accomplish the foregoing objects and others which will become apparent hereinafter, it is proposed in one form of this invention to provide a flow controlling valve including the following elements: a passage through which the pressurized controlled fluid is routed; a valve seat disposed within the passage; a flexible diaphragm disposed adjacent the valve seat; first and second apertures in the diaphragm; a chamber substantially isolated from the passage by means of the diaphragm and communicating therewith by means of the first and second apertures; and means for selectively opening and closing the first aperture, this means preferably being in the form of a common solenoid.

The diaphragm is mounted in such a way that its flexing, the motion of its geometric center, is along its axial centerline—that is, perpendicular to its seating surface. Consequently, the material of the flexible diaphragm has a predetermined predominant radial direction of distension originating at this geometric center. The second aperture is a bleed hole which allows passage of a predetermined amount of controlled fluid from the passage into the chamber for accumulation or evacuation dependent upon the condition of the solenoid relative to opening and closing the first aperture. Closing of the first aperture causes accumulation of the pressurized control fluid within the chamber and results in a seating pressure differential across the diaphragm tending to drive the diaphragm against the valve seat. Evacuation of the chamber by means of opening the first aperture tends to create an unseating pressure differential which drives the diaphragm away from the valve seat, thereby permitting flow through the passage past the seat without hindrance.

The second aperture or bleed hole in the improved form contemplated in the present invention is oblong in its perimetrical configuration. The minor axis of this oblong aperture is aligned in the direction in which the material of the diaphragm stretches under loaded conditions; that is, in the direction of the predetermined predominant direction of distension. In operation, upon loading of the diaphragm, the stretching or distension of the material of the diaphragm in the vicinity of the bleed hole serves to enlarge rather than constrict the area of this aperture by extending the minor axis thereof and reducing the major axis thereof to bring the perimeter into a more circular form. This enlargement serves to enhance the functioning and reliability of the valve by maintaining proper performance of the bleed hole.

DETAILED DESCRIPTION OF A PREFERRED EMBODIMENT

Figure 1:
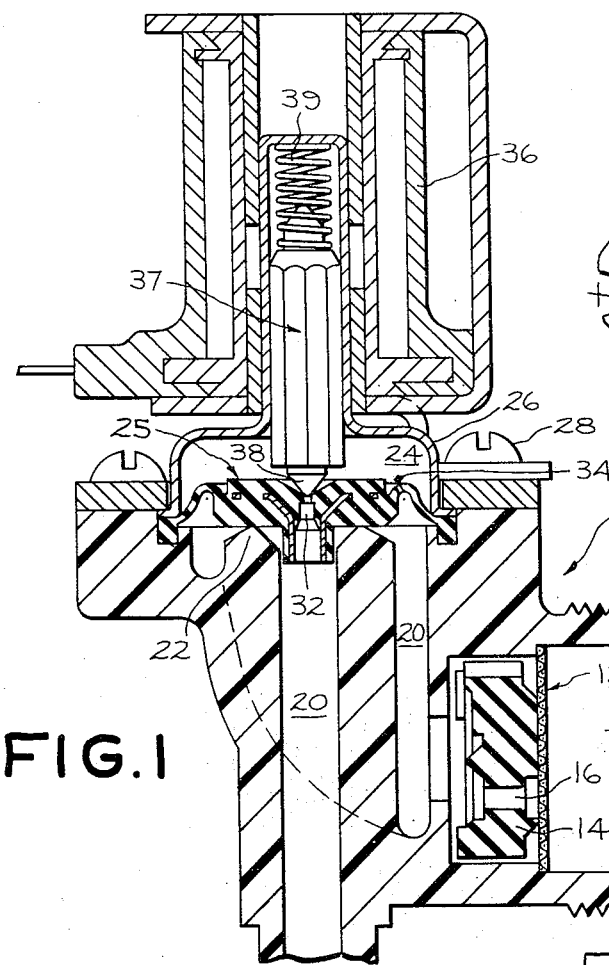
FIG. 1 is a sectional view of a fluid control valve embodying the present invention.

FIG. 1 shows a valve structure, generally designated 10, having an inlet 11 in which is disposed a filter screen 12. A flow stabilizing device 14 is disposed within the inlet and has at least one aperture 16 therethrough for passing fluid into a generally U-shaped passage 20. The pressurized fluid to be controlled is fed into the inlet 11 from a suitable source by attachment to the threaded portion shown thereon.

Passage 20 is provided with a valve seat 22. A chamber 24 is formed proximate the passage by an outer wall 26. Adjacent the valve seat 22, and between the valve seat and the chamber 24 is disposed a generally circular flexible diaphragm 25 having its circumference sealed with respect to the outer structure of the valve, as for example by compression beneath a flanged portion of the outer wall 26 by a plurality of screws 28. The diaphragm is mounted in such a way as to substantially isolate chamber 24 from the passage 20. Further, the diaphragm is constrained so that its flexibility is limited to flexing (reciprocal motion of its center) in a predetermined direction, that direction being along the axial centerline of the diaphragm 25, perpendicular to its seating surface. Thus, the diaphragm material has a predetermined predominant direction of distension or stretching in the radial direction; that is, as the center of the diaphragm is allowed to flex along the axial centerline, stretching or distension of the diaphragm material will be radial.

The diaphragm is provided with a central first aperture 32 of predetermined area. A second aperture 34 of predetermined smaller area is disposed at a point in the diaphragm radially spaced from the first aperture.

FIG. 1 further shows a solenoid 36 having an armature 37 which cooperates with the valve by means of a protrusion 38 on the end of the armature 37. The protrusion 38 is adapted to seat within and effectively close the central first aperture 32 of disphragm 25. The solenoid is adapted to be electrically energized whereby armature 37 is magnetically withdrawn away from aperture 32 of the diaphragm 25. De-energization of the solenoid permits an energy-storing spring 39 to react and cause the armature 37 to reseat its protrusion 38 in the aperture 32. The solenoid 36 may be of any conventional type, and detail description thereof is unnecessary to an understanding of this invention.

Figure 2:
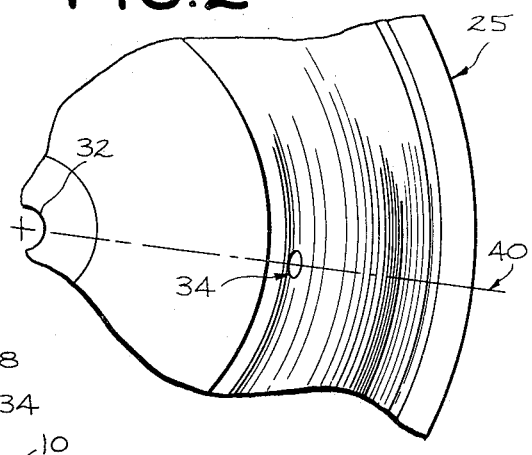
FIG. 2 is a top view of a portion of a diaphragm incorporating the oblong bleed hole of the present invention shown in an unstressed condition.

Referring now to FIG. 2, this view shows the relationshp between first aperture 32 and second aperture or bleed hole 34 in diaphragm 25, and more particularly discloses the configuration of bleed hole 34. In the present embodiment, aperture 32 is disposed in the center of generally circular flexible diaphragm 25, while bleed hole 34 is radially spaced therefrom by a predetermined distance. Aperture 32 is of any perimetrical configuration suitable for cooperation with the protrusion 38 carried by armature 37 in FIG. 1.

Of greater interest with respect to the present invention are the perimetrical configuration and the orientation of bleed hole 34. It is contemplated in the present invention that bleed hole 34 be generally oblong in perimetrical configuration; that is, that it be of any particular shape having one axis of symmetry substantially longer than a perpendicular second axis of symmetry. In the present embodiment, bleed hole 34 is shown to be of generally oval perimeter, but it is contemplated that any generally oblong shape will satisfy the purposes hereinafter delineated. For example, a rectangular configuration would also be satisfactory.

In addition to the oblong perimetrical configuration of bleed hole 34, the orientation of the bleed hole with respect to the diaphragm material is important. It was earlier stated that disphragm 25 is constrained so that its center is reciprocal along its axial centerline. Consequently, the distension of the diaphragm material will be in a substantially radial direction. The diaphragm, then, has a predetermined predominant direction of distension in the radial direction, in this instance designated by a typical radial line 40 in FIG. 2. The preferred orientation of oblong bleed hole 34 is such that its minor axis is in substantial alignment with the predetermined predominant direction of distension. This is illustrated in FIG. 2 by reason of the fact that the minor axis of bleed hole 34 substantially overlies radial line 40.

Figure 3:
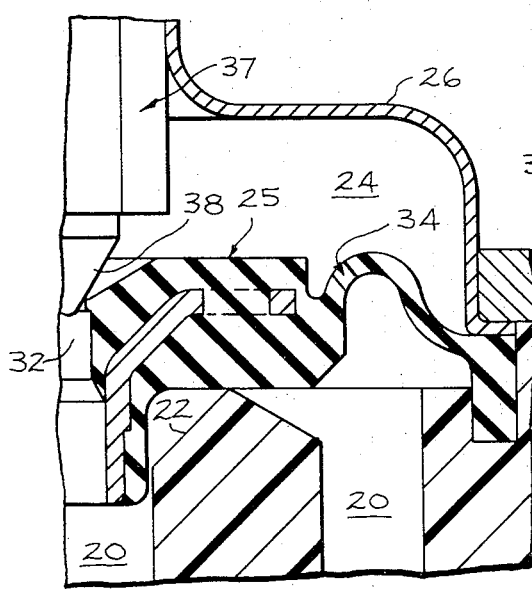
FIG. 3 is an enlarged sectional view of a portion of the valve of FIG. 1 showing the diaphragm seated against the valve seat.
Figure 4:
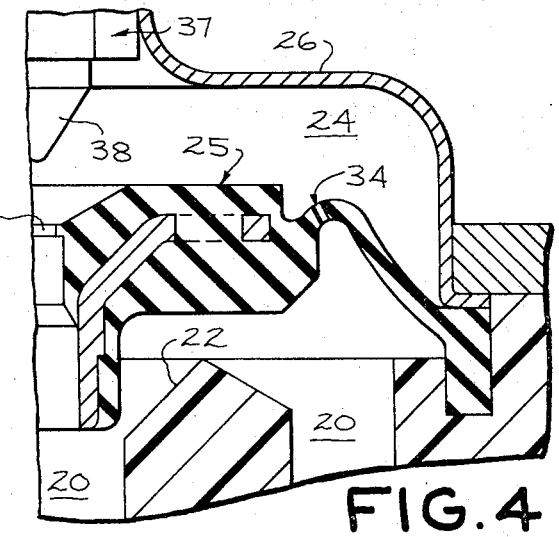
FIG. 4 is a view similar to FIG. 3 showing the diaphragm in an unseated condition.

Referring now to FIGS. 3 and 4, the operation of the valve incorporating the bleed hole of the present invention is shown. In FIG. 3, the diaphragm 25 is shown seated against valve seat 22 in passage 20 effectively blocking flow of the fluid within passage 20. In this condition, a predetermined portion of the fluid has been allowed to enter chamber 24 by means of the bleed hole 34; and, there being no available exit route, this portion of fluid has remained therein creating a seating pressure differential across diaphragm 25 tending to maintain the diaphragm in its position seated against valve seat 22. The blocking of the possible exit route through first aperture 32 is accomplished by the insertion of the protrusion 38 of solenoid armature 37 into aperture 32, effectively sealing it against the passage of fluid from the chamber 24 therethrough to the portion of the passage 20 downstream of the valve seat 22.

FIG. 4 discloses the diaphragm 25 in an unseated open condition wherein the pressurized controlled fluid within passage 20 is allowed to flow freely past valve seat 22. To reach this condition from that disclosed in FIG. 3, the solenoid 36 has been energized and armature 37 and its associated protrusion 38 have been thereby withdrawn from aperture 32, resulting in the opening of an exit route for the fluid within chamber 24. Since the area of aperture 32 is larger than the area of bleed hole 34, more fluid may pass through aperture 32 and out of the chamber 24 than will enter chamber 24 by means of bleed hole 34 from the portion of the passage 20 upstream of the diaphragm 25. Consequently, a reverse or unseating pressure differential is created which tends to force the diaphragm away from valve seat 22 and to open the passage for the flow of fluid. Subsequently, the diaphragm 25 is maintained in its unseated condition by the force thereagainst of the pressurized fluid progressing past valve seat 22.

Should it be desired to stop the flow by reseating the diaphragm 25 (and thus to resume the condition disclosed in FIG. 3), the solenoid 36 is again de-energized to move the armature 37 downward, inserting protrusion 38 into and sealing aperture 32. Once again, the bleed hole 34 serves to allow the entry of controlled fluid from passage 20 into chamber 24. Lacking an exit, this fluid fills the chamber 24 creating a pressure within the chamber which, in combination with the vortex low pressure effect caused by the flow of fluid past the valve seat 22 from the upstream to the downstream sides thereof, draws the diaphragm 25 into position against the valve seat 22 and thereby effectively precludes further flow.

It is apparent from the description of the operation of this valve that the maintenance of flow capability through bleed hole 34 is of ultimate importance to the proper functioning thereof. If for any reason the bleed hole becomes blocked to flow from passage 20 into chamber 24, it will be impossible to create the seating pressure differential required to bring the diaphragm 30 into contact with valve seat 22. As a result, the flow will not be controlled and flooding is likely.

In the substantially unstressed condition of the diaphragm 25 shown in FIG. 3, a bleed hole of arbitrary configuration is satisfactory to serve its purpose. However, in the stressed condition of FIG. 4, wherein the pressurized controlled fluid impinges the diaphragm during its flow from the upstream to downstream portions of passage 20, the material of the diaphragm is radially distended; and any aperture therein is deformed from its original perimetrical configuration. If the valve is used in an application wherein a fluid to be controlled is more than nominally pressurized, this distension and deformation can become quite substantial. The use of prior art circular or substantially circular bleed holes is unsatisfactory for the reason that distension of the material surrounding the bleed holes results in a reduction of flow area therethrough. Sufficient loading and/or continual use of such prior art diaphragms has caused their bleed holes to close altogether. Under such conditions the closing by the solenoid of aperture 32 by means of protrusion 38, would have no effect on the position of the diaphragm. This is because no seating pressure differential is created thereacross since no portion of the controlled fluid is able to enter chamber 24. As a result, the valve would become ineffectual to control flow of fluid and undesirable flooding may occur.

Figure 5:
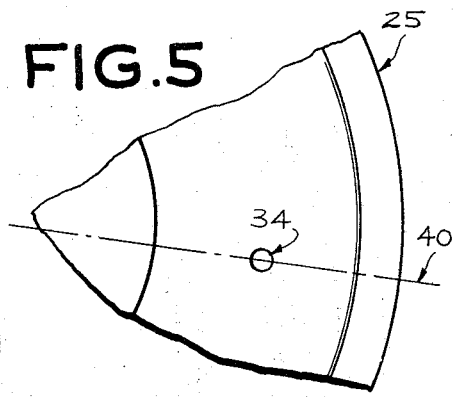
FIG. 5 is the same view as that in FIG. 2 but showing the diaphragm in a distended condition.

The present invention solves this problem by utilizing a bleed hole of oblong configuration as described above and by orienting this bleed hole such that its minor axis is in substantial alignment with the predetermined predominant direction of distension of the flexible diaphragm. Referring to FIGS. 2 and 5, the diaphragm and bleed hole are disclosed in unstressed and stressed conditions respectively. FIG. 5 is illustrative of the fact that under stressed conditions, the oblong bleed hole of FIG. 2 is radially distended into a substantially circular perimetrical configuration due to its orientation relative to the distension of the diaphragm material. This is the result of the disposition of the minor axis of the oblong bleed hole substantially in alignment with radial line 40 along which distension primarily occurs. As the diaphragm material proximate bleed hole 34 is radially distended, the minor axis is stretched while the major axis becomes slightly shortened. Thus, the substantially circular bleed hole condition illustrated in FIG. 5 is effected.

This circularization and slight enlargement of the area of the bleed hole 34 is in contradistinction from the effect of stress upon the flexible diaphragms of the prior art having substantially circular unstressed bleed holes. The bleed holes of the prior art tend to become smaller upon distension and often close altogether. The enlargement of the bleed hole of the present invention insures that flow through the bleed hole into chamber 24 will not cease at the critical time when it is sought to close the valve to further flow. Thus, the utilization of the valve incorporating a diaphragm having a bleed hole according to the present invention is a solution to the flooding problem prevalent in similar valves of the prior art.

Although the present invention has been discussed with respect to the aforementioned embodiment, it is understood that modifications and variations may be effected in the present invention without departing from the scope of the novel concepts thereof or from the purview of the appended claims.

What is claimed as new and desired to be secured by letters Patents of the United States is:

1. In a valve for controlling fluid flow within a passage, the valve including a valve seat in the passage and a flexible diaphragm for seating upon the valve seat, the diaphragm having a first aperture therein and further having a predetermined predominant direction of distension, the valve further including a chamber substantially isolated from the passage and means for unseating the diaphragm responsive to selective communication between the passage and the chamber through the first aperture, the improvement comprising:

a second aperture in the diaphragm providing communication between the passage and the chamber, said second aperture being of smaller area than the area of the first aperture, the second aperture further having an oblong perimetrical configuration and being oriented with its minor axis in substantial alignment with the predominant direction of distension.

2. In a valve for controlling fluid flow within a passage, the valve including a valve seat within the passage and a chamber substantially isolated from the passage, the improvement comprising:

a flexible diaphragm for seating upon the valve seat, the diaphragm having a first aperture therein for providing communication between the passage and the chamber, the diaphragm further having a predetermined predominant direction of distension, and including a second aperture providing communication between the passage and the chamber and having a predetermined area smaller than the area of the first aperture, the second aperture having an oblong perimetrical configuration and being oriented with its minor axis in substantial alignment with the predominant direction of distension; and means for unseating the diaphragm from the seat responsive to selective communication between the passage and the chamber through the first aperture.

3. In a valve for controlling fluid flow within a passage, the valve including a valve seat within the passage and a chamber substantially isolated from the passage, the improvement comprising:

a substantially circular flexible diaphragm for seating upon the valve seat, said diaphragm having a first aperture disposed proximate its center for providing communication between the passage and the chamber, the diaphragm further having a predetermined predominant radial direction of distension, and including a second aperture radially spaced from the first aperture for providing communication between the passage and the chamber and having a predetermined area smaller than the area of the first aperture, the second aperture having an elongated perimetrical configuration and having a minor axis oriented in substantial alignment with the direction of distension; and means for unseating the diaphragm from the seat responsive to selective communication between the passage and the chamber through the first aperture.

4. The valve of claim 3 wherein the oblong perimetrical configuration of the second aperture is substantially oval.

5. A flexible diaphragm for use in a valve, the diaphragm having a predetermined predominant direction of distention, and comprising:
   a first generally centrally located aperture therein;
   a second aperture adapted to remain open during distention and disposed radially outward a predetermined distance from the first aperture and having a predetermined smaller area than the area of the first aperture; and
   said second aperture having a generally non-circular and elongated perimetrical configuration and being oriented with its minor axis in substantial alignment with the predominant direction of distension such that distention of the diaphragm tends to distort the configuration of said second aperture such that it becomes more nearly circular.

* * * * *